United States Patent
Nishizawa et al.

(10) Patent No.: US 7,440,708 B2
(45) Date of Patent: Oct. 21, 2008

(54) MULTIFUNCTION APPARATUS

(75) Inventors: Minoru Nishizawa, Fujisawa (JP); Hideki Nakatsuka, Yokohama (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 187 days.

(21) Appl. No.: 11/567,512

(22) Filed: Dec. 6, 2006

(65) Prior Publication Data

US 2007/0092279 A1    Apr. 26, 2007

Related U.S. Application Data

(63) Continuation of application No. 11/065,571, filed on Feb. 25, 2005, now Pat. No. 7,171,135.

(30) Foreign Application Priority Data

Feb. 26, 2004  (JP) .............................. 2004-052000
Jun. 1, 2004   (JP) .............................. 2004-163634

(51) Int. Cl.
    *G03G 15/20* (2006.01)
(52) U.S. Cl. .............................. 399/70; 399/38; 399/80
(58) Field of Classification Search .................... 399/38, 399/70, 80
    See application file for complete search history.

(56) References Cited

U.S. PATENT DOCUMENTS

| | | | |
|---|---|---|---|
| 5,250,984 A | 10/1993 | Masai | |
| 6,577,825 B1 | 6/2003 | Gonnella et al. | |
| 6,694,115 B2 | 2/2004 | Weaver | |
| 6,728,346 B2 | 4/2004 | Czyszczewski et al. | |
| 6,873,806 B2 | 3/2006 | Kobayashi et al. | |
| 2001/0048823 A1 | 12/2001 | Nomura et al. | |

2002/0114024 A1    8/2002    Chiu (Continued)

FOREIGN PATENT DOCUMENTS

EP    1014678    6/2000

(Continued)

OTHER PUBLICATIONS

English Language Abstract of JP 2002-007264.

(Continued)

*Primary Examiner*—David M. Gray
*Assistant Examiner*—Ruth N Labombard
(74) *Attorney, Agent, or Firm*—Greenblum & Bernstein, P.L.C.

(57) ABSTRACT

A multifunction apparatus according to the present invention transmits an electromagnetic wave signal to a memory card carried by a user who enters a detection area, scans identification information of the user for user authentication, and starts a warm-up operation immediately after the authentication. Accordingly, the time period spent by the user starting from the user's arrival at the multifunction apparatus until the completion of the warm-up operation is shortened. In addition, the multifunction apparatus determines whether the user remains in the detection area after a job is completed, and transitions from a normal mode to an energy-save mode when it is determined that the user is not remaining in the detection area, the normal mode being in a state where sufficient electrical power is supplied for a job execution, the energy-save mode being in a state where the power supply is decreased compared to the normal mode.

8 Claims, 9 Drawing Sheets

U.S. PATENT DOCUMENTS

| | | |
|---|---|---|
| 2003/0053111 A1 | 3/2003 | Endo |
| 2003/0088570 A1 | 5/2003 | Hilbert et al. |
| 2005/0152544 A1 | 7/2005 | Kizawa |
| 2005/0185215 A1 | 8/2005 | Nishizawa et al. |
| 2005/0185216 A1 | 8/2005 | Mitsuhashi et al. |
| 2005/0185217 A1 | 8/2005 | Nishizawa et al. |
| 2005/0191077 A1 | 9/2005 | Nishizawa et al. |
| 2005/0200885 A1 | 9/2005 | Nishizawa et al. |

FOREIGN PATENT DOCUMENTS

| | | |
|---|---|---|
| EP | 1093287 | 4/2001 |
| JP | 04182675 | 6/1992 |
| JP | 8-242326 | 9/1996 |
| JP | 9-168066 | 6/1997 |
| JP | 10-315535 | 12/1998 |
| JP | 11-143651 | 5/1999 |
| JP | 2001-292262 | 10/2001 |
| JP | 2002-007264 | 1/2002 |
| JP | 2002-162875 | 6/2002 |
| JP | 2003-233725 | 8/2003 |
| WO | 97/38523 | 10/1997 |

OTHER PUBLICATIONS

English Language Abstract of JP 2001-292262.
English Language Abstract of JP 10-315535.
English Language Abstract of JP 11-143651.
English Language Abstract of JP 2003-233725.
English Language Abstract of JP 8-242326.
English Language Abstract of JP 2002-162875.
English Language Abstract of JP 9-168066.
English Language Abstract of JP 04-182675.
Trevor et al., "Issues in Personalizing Shared Ubiquitous Devices," Online! vol. 2498, 2002, pp. 56-72, XP002356517, retrieved from the Internet: URL: http://zing.ncsl.nist.gov/ubicom02/UbiComp02_Workshop/papers/2002_Trevor_Personalization.pdf, retrieved on Nov. 29, 2005.

Fig.2

<Table information in memory card>

User(a)

Personal ID info
(User ID:123456) — 201a

User(b)

Personal ID info
(User ID:234567) — 201b

⋮

User(x)

Personal ID info
(User ID:345678) — 201c

Fig.3

<Personal information table in server>

MULTIFUNCTION APPARATUS

CROSS-REFERENCE TO RELATED APPLICATION

This is a continuation of pending U.S. patent application Ser. No. 11/065,571, filed Feb. 25, 2005, the contents of which are expressly incorporated by reference herein in its entirety.

BACKGROUND OF THE INVENTION

1. Field of the Invention

The present invention relates to a multifunction apparatus that has a plurality of functions including a copier function.

2. Description of Related Art

A multifunction apparatus having a plurality of functions such as printer, copier, scanner, facsimile, and e-mail functions has become common. There are various types of multifunction apparatuses that provide different functions. In this explanation, multifunction apparatuses having a fusing apparatus are used, the fusing apparatus fusing an image to a recording medium through application of heat.

For a purpose of reducing power consumption during a standby period, many multifunction apparatuses are now equipped with an energy-save mode that reduces the temperature of the fuse apparatus during the standby period.

An multifunction apparatus having such an energy-save mode starts warming up when it detects a document placed on a document reader or an operation from an operation panel (e.g., Related Art 1). In other words, the warm-up is initiated only after a user directly performs a certain operation on the multifunction apparatus. The period starting from the beginning of the warm-up to the time the heater reaches a predetermined temperature (warm-up period) is usually tens of a second to a several minutes, depending on the type of the multifunction apparatus. In addition, after a copy/print job is completed, the heater unit is usually kept at a predetermined temperature for a predetermined time period, in order to allow a quick execution of another job. When there is no immediate job, the multifunction apparatus usually transitions to the energy-save mode.

[Related Art 1] Japanese Patent Laid Open Application 10-315535

With the above-described configuration that initiates the warm-up only after the user directly performs a certain operation on the multifunction apparatus, the user is required to wait in front of the multifunction apparatus during the warm-up period. Therefore, it is desirable to shorten the time the user spends waiting for the multifunction apparatus to warm-up. In addition, with the above-described configuration that makes a transition to the energy-save mode only after a predetermined time period upon a job completion, it is effective when a series of jobs are performed on the multifunction apparatus. However, when jobs are not performed in sequence, it causes an inefficient use of the energy. Further, when the setup time (for transitioning to the energy-save mode) is set short, the multifunction apparatus can quickly move into the energy-save mode in a short period of time. However, this may inconvenience the user who intends to perform a following job but finds the multifunction apparatus transitioning back to the energy-save mode before the next job is ready.

SUMMARY OF THE INVENTION

The present invention addresses the above described problems. The purpose of the invention is to provide a multifunction apparatus that can advance the warm-up start timing of the fusing apparatus and thereby shorten the time period spent by the user in front of the multifunction apparatus, the period starting from the user's arrival at the multifunction apparatus until the completion of the warm-up. Another purpose of the invention is to provide a multifunction apparatus that saves energy consumption by instantly transitioning from a normal mode to an energy-save mode when the user is not in a detection area (in the proximity of the multifunction apparatus), while preventing unnecessary transitions to the energy-save mode.

The multifunction apparatus according to the present invention transmits an electromagnetic wave signal to a memory card carried by a user who enters a detection area, scans identification information of the user for user authentication, and starts a warm-up operation immediately after the authentication. Further, the multifunction apparatus according to the present invention constantly or periodically transmits the electromagnetic wave signal to the memory card to the user who is in the detection area, scans the identification information of the user, determines whether the user remains in the detection area after a job is completed, and transitions from a normal mode to an energy-save mode when it is determined that the user is not remaining in the detection area, the normal mode being in a state where sufficient electrical power is supplied for a job execution, the energy-save mode being in a state where the power supply is decreased compared to the normal mode.

BRIEF DESCRIPTION OF THE DRAWINGS

The present invention is further described in the detailed description which follows, with reference to the noted plurality of drawings by way of non-limiting examples of exemplary embodiments of the present invention, in which like reference numerals represent similar parts throughout the several views of the drawings, and wherein.

DETAILED DESCRIPTION OF PREFERRED EMBODIMENTS

The embodiment of the present invention is explained in the following, in reference to the above-described drawings.

Figure 1:
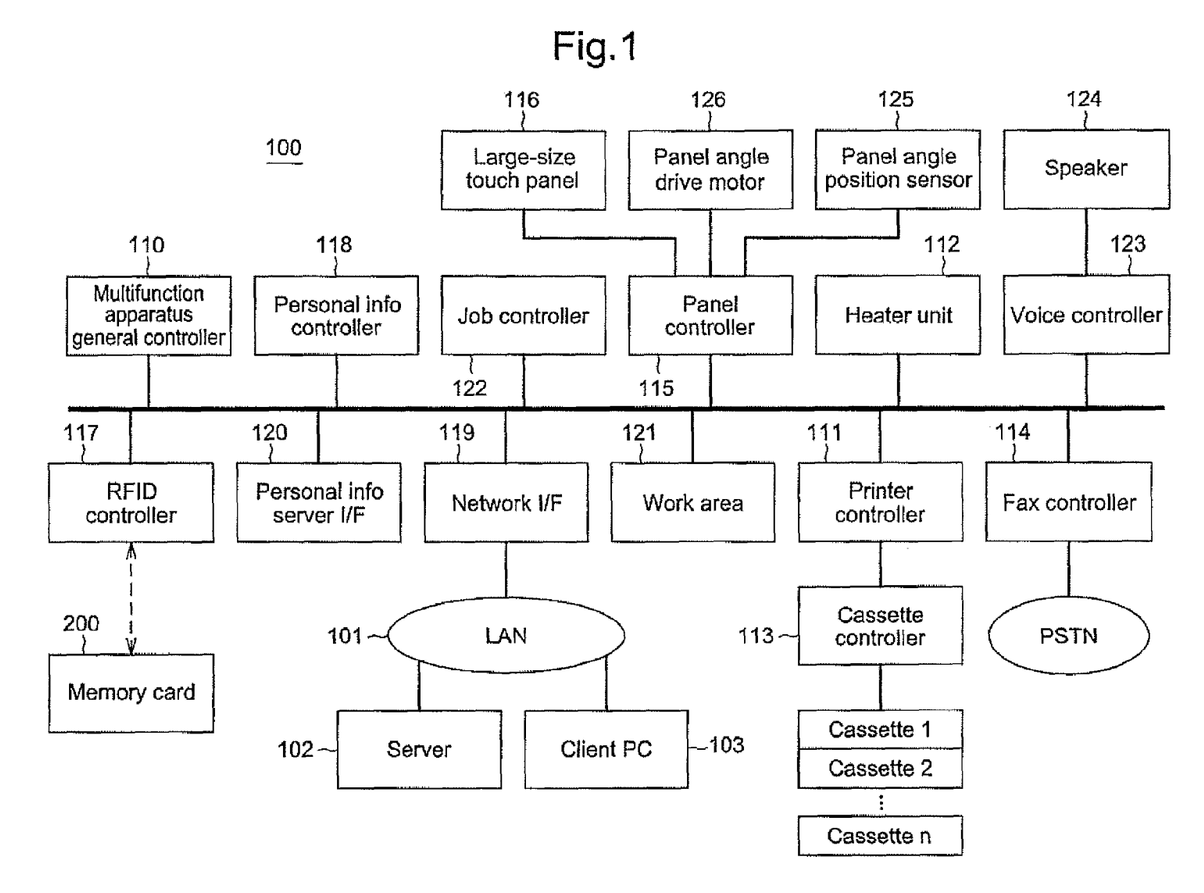
FIG. 1 is a functional block diagram of a multifunction apparatus according to an embodiment of the present invention.

FIG. 1 is a functional block diagram of a multifunction apparatus according to the embodiment of the present invention. FIG. 1 also shows a portion of a network.

Multifunction apparatus 100 can be connected to various servers 102 and client PCs 103, via LAN 101.

Server 102 can be a personal information server that stores a personal information table and performs personal authentication and personal information distribution. Server 102 can also be a web server that executes a job selected from a menu in a remote procedure method. In the following description, server 102 is illustrated as personal identification server 102.

Although multifunction apparatus 100 includes printer, copier, scanner, facsimile, and e-mail functions, FIG. 1 only shows blocks related to the printer and facsimile functions.

Multifunction apparatus general controller 110 controls the overall multifunction apparatus 100. When executing a job related to printer, copier, scanner, and facsimile functions (copying, printing, etc.), a predetermined amount of power supply is required for each related unit of the multifunction apparatus. The state where the sufficient power supply is provided is referred to as a normal mode. In addition, when there is no job operated by the user (including receiving a facsimile) for a predetermined period of time, the power supply sufficient for job operations is not necessary. Therefore, the unnecessary power supply is reduced in order to save the power consumption. This status where the power consumption is reduced compared to the normal mode is referred to as energy-save mode. Multifunction apparatus general controller 110 has a function to switch between the normal and energy-save modes.

Printer controller 111 executes a process that converts printout data (given from a client) into image data in a predetermined format, Printer controller 111 especially gives a warm-up instruction to heater unit (fusing apparatus) 112 in an image generation unit (not shown in the figure).

In the present embodiment, there are two types of warm-up operations, The first one is an advance warm-up operation where heater unit 112 is warmed up immediately after the user authentication using memory card 200 is performed. The second one is a normal warm-up operation where heater unit 112 is warmed up after the user performs a certain operation on multifunction apparatus 100.

Printer controller 111 also gives a cassette selection instruction to cassette controller 113.

Cassette controller 113 selects an indicated cassette from a plurality of vertically stacked cassettes (1)-(n), and feeds paper to the image generation unit.

Fax controller 114 has a modem that is connected to a PSTN to execute steps for a facsimile communication.

Panel controller 115 displays an operation screen and the like on large-size touch panel 116 and analyzes an operation input by the user from where the user touched on large-size touch panel 116 and from the displayed contents.

RFID controller 117 constantly/periodically reads and writes data on memory card 200 using electromagnetic wave signals. When a magnetic field is applied to memory card 200 from RFID controller 117, the reflected electromagnetic wave includes effect (information) corresponding to the memory contents of memory card 200. RFID controller 117 detects the memory contents of memory card 200 using the reflected electromagnetic wave. Conversely, electromagnetic wave signals applied from RFID controller 117 to memory card 200 is used to write information because the signals have a magnetic influence on memory card 200. RFID controller 117 performs non-contact reading/writing of card registration data, via electromagnetic wave signals, from/into memory card 200 in the detection area approximately within a 1-meter radius range.

Personal information controller 118 manages the write-in destination of the registration data, which is read from memory card 200.

In addition, personal information controller 118 notifies RFID controller 117 of data to be written in memory card 200.

Network I/F 119 is a section that interfaces with LAN 101.

Personal information server I/F 120 executes a process for communicating with personal information server 102 among servers on LAN 101.

Work area 121 stores data received from memory card 200 and personal information server 102.

Job controller 122 provides a command to an appropriate unit when a job is executed using a function such as copier, printer, facsimile, scanner, or e-mail functions.

Voice controller 123 stores voice data for a voice guidance. Upon receiving a voice guidance instruction (in synchronization with the user's operation) from panel controller 115 and job controller 122, voice controller 123 outputs the corresponding voice data to speaker 124. It is preferable that the voice guidance is provided to assist the operation on the operation screen that is displayed on large-size touch panel 116. However, other types of voice guidance can be provided.

Panel angle position sensor 125 detects an angle of large-size touch panel 116. Panel angle drive motor 126 receives a control signal from panel controller 115 and adjusts the angle of large-size touch panel 116. Although in this embodiment, the angle of large-size touch panel 116 is adjustable, the angle can be at a fixed position.

Multifunction apparatus 100 has the above-described configuration.

Figure 2:
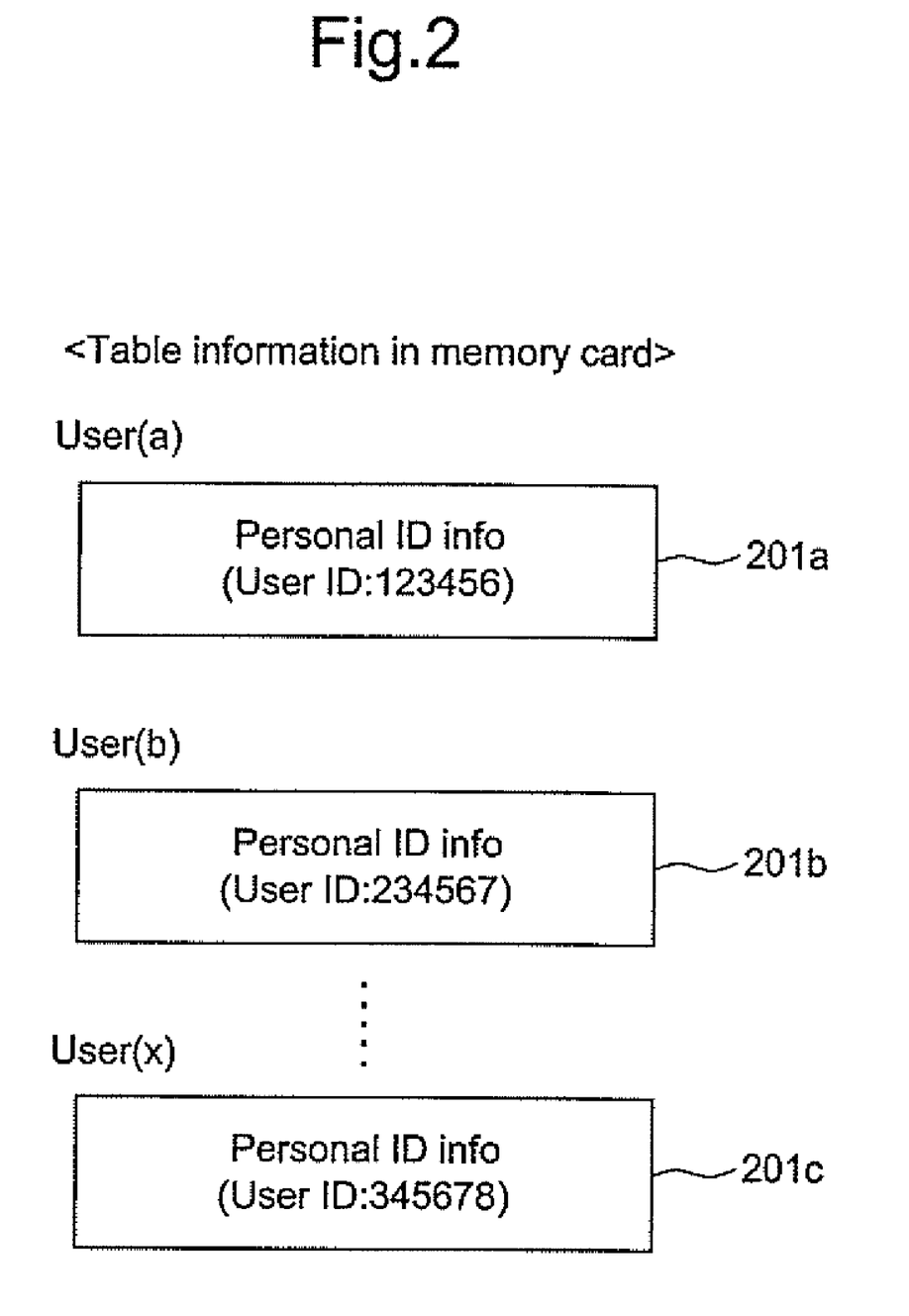
FIG. 2 illustrates registration information of a memory card according to the embodiment of the present invention.

The following illustrates registration information of memory card 200, using FIG. 2. FIG. 2 illustrates the registration information of memory card 200.

As shown in the figure, memory card 200 only stores user ID 201 as personal identification information. This identification information is used for the user authentication and retrieving the user information. As shown in FIG. 2, personal identification information (user IDs) 201a-201c are separately stored for each user (a)-(x).

It is preferable to limit the registration information of memory card 200 to a user ID for security purposes. However, additional information can be registered if necessary.

Figure 3:
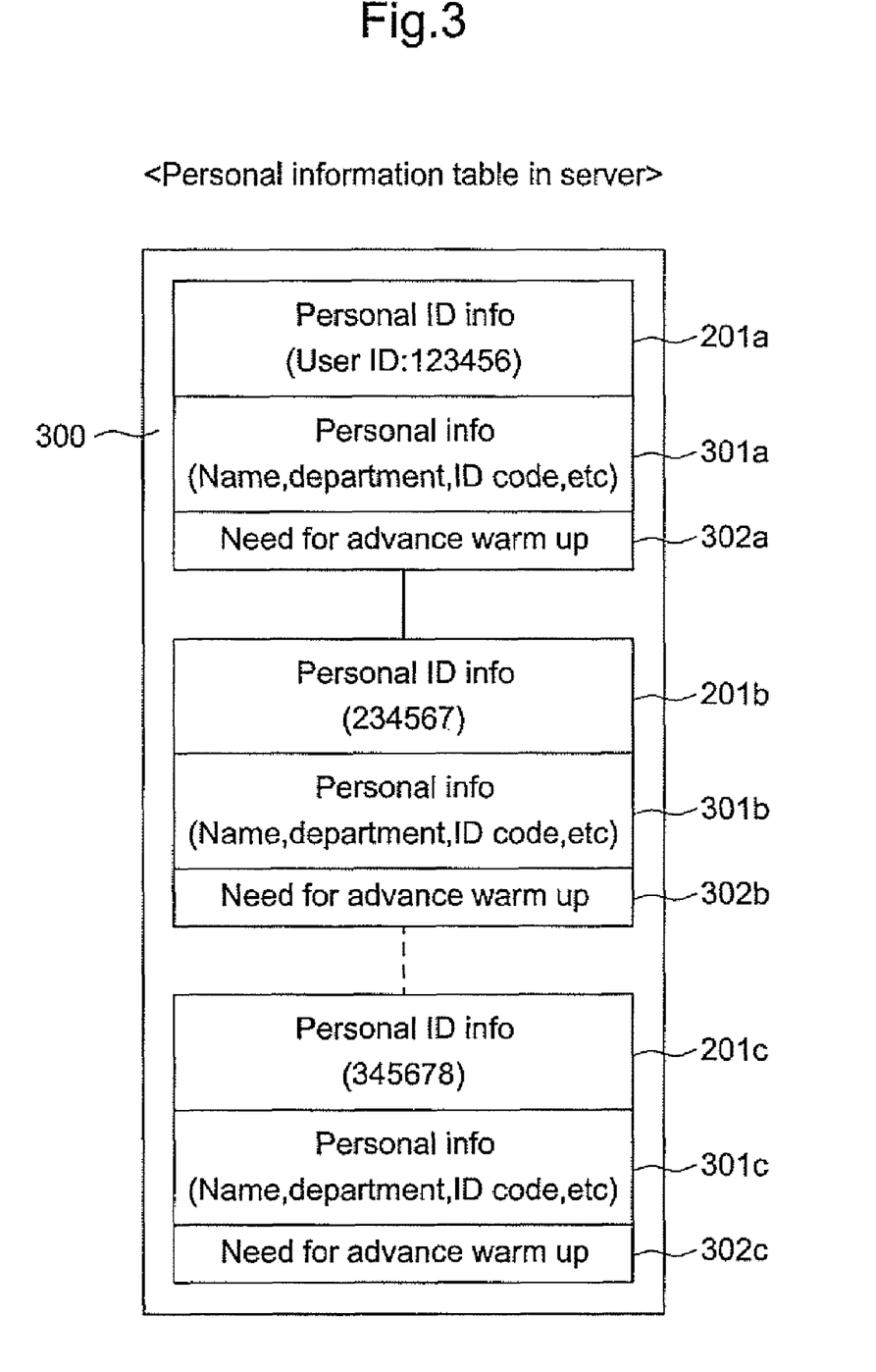
FIG. 3 illustrates a personal information table according to the embodiment of the present invention.

A personal information table is registered in personal information server 102. FIG. 3 illustrates a configuration of the personal information table.

Personal information table 300 includes user IDs 201a-201c (personal identification information, which differs for each user), personal information 301a-301c (name, department to which the user belongs, ID code, etc.), and warm-up information (indicating whether warm-up start is needed) 302a-302c.

User IDs 201a-201c are the same as the user IDs shown in FIG. 2.

Although the personal information 301a-301c is not limited to the above configuration as long as the information is related to the personal information, the personal information in this embodiment includes a personal name, department to which the user belongs, ID code (not the user ID), etc.

Warm-up information (whether warm-up start is needed) 302a-302c indicates whether heater unit 112 is warmed up immediately after the user authentication using memory card 200 is performed (advance warm-up). When warm-up information (whether warm-up start is needed) 302a-302c includes "Yes", the advance warm-up operation is performed. When the information includes "No", the normal warm-up operation is performed where heater unit 112 is warmed up after the user performs a certain operation on multifunction apparatus 100.

Figure 4:
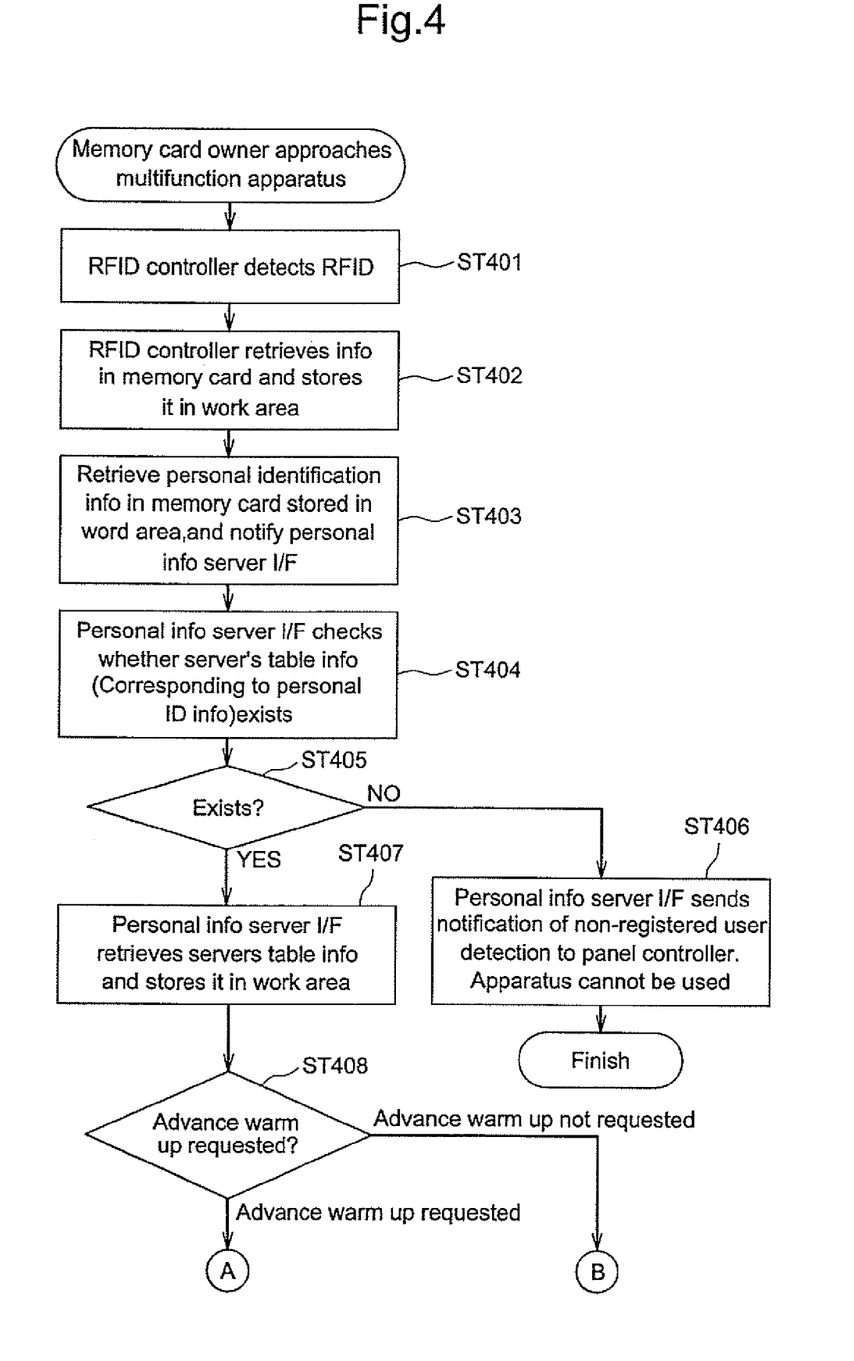
FIG. 4 is a first flowchart illustrating an operation of the multifunction apparatus according to the embodiment of the present invention.
Figure 5:
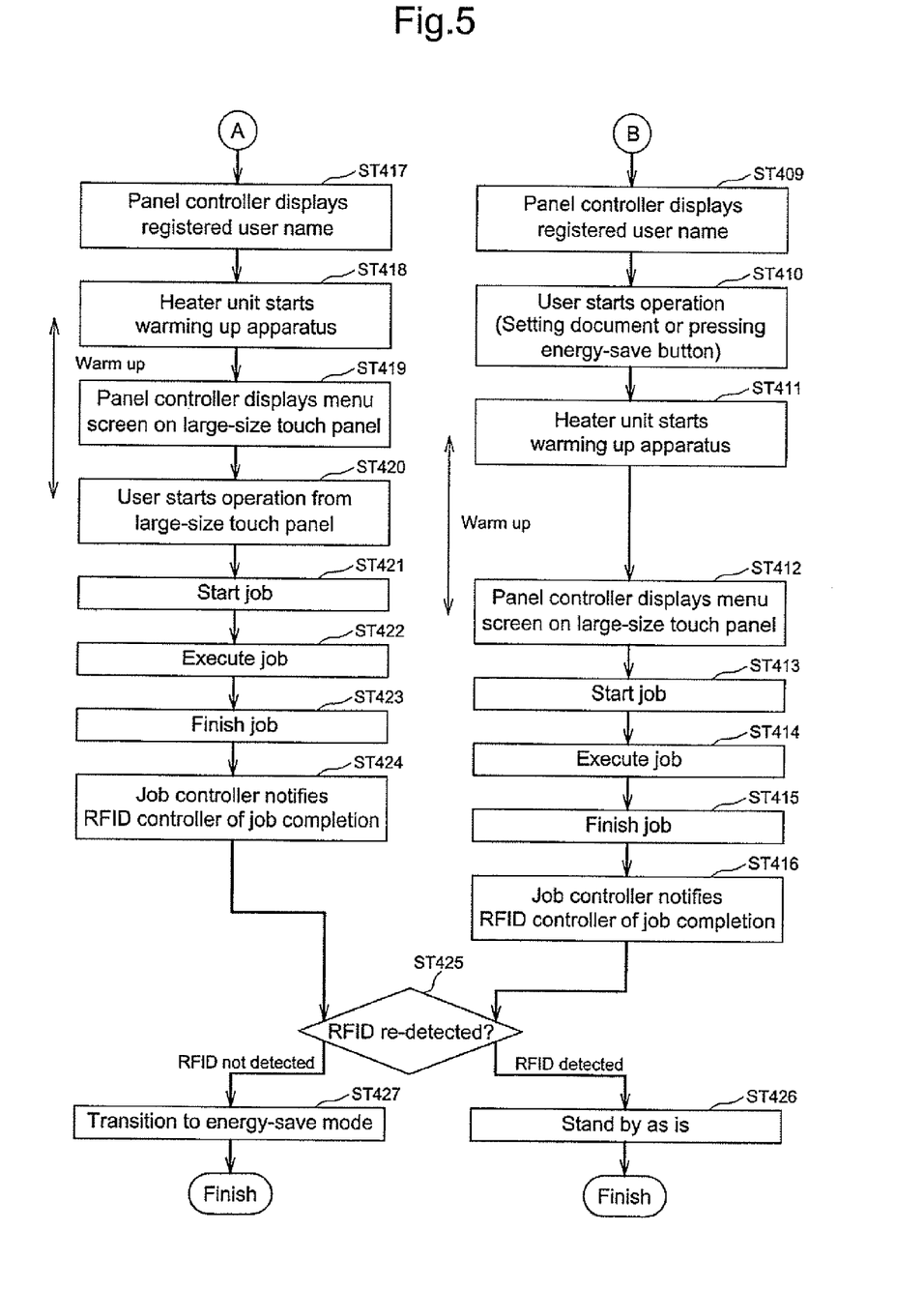
FIG. 5 is a second flowchart illustrating an operation of the multifunction apparatus according to the embodiment of the present invention.

FIGS. 4 and 5 are flowcharts that illustrate an operation of multifunction apparatus 100 having the above-described configuration according to the present embodiment.

As an example, the user carrying memory card 200 stands in front of multifunction apparatus 100 to perform a desired operation.

RFID controller 117 of multifunction apparatus 100 detects that the user and memory card 200 have entered an electromagnetic signal detection area (ST 401). When the electromagnetic wave signal is reflected on memory card 200 (carried by the user), the registration information within memory card 200 is readout and stored in work area 121 (ST 402).

As shown in FIG. 2, memory card 200 includes user ID 201 of the user.

Accordingly, multifunction apparatus 100 automatically obtains user ID 201 of the user in the proximity. In other words, the user can have user ID 201 automatically input in multifunction apparatus 100 without any manual input.

Next, personal information controller 118 retrieves user ID 201 (personal identification information) from the registration information stored in work area 121 and notifies the same to personal information server I/F 120 (ST 403).

Personal information server I/F 120 transmits user ID 201 to personal information server 102 and issues a personal authentication request to personal information server 102 (ST 404), the request being made to check the existence of personal information table 300 that corresponds to user ID 201 (ST 404).

Upon receiving the personal authentication request for user ID 201 (from personal information server I/F 120), personal information server 102 uses user ID 201 to determine whether personal information table 300 corresponding to user ID 201 is registered (ST 405).

As shown in FIG. 4, each personal information table 300 includes a user ID 201, When personal information table 300 having the matching user ID 201 is registered, it is determined that personal information table 300 of the user is registered in personal information server 102.

When personal information table 300 corresponding to the transmitted user ID 201 is registered, personal information server 102, in response to the personal authentication request, transmits a response "registered user detection notification". When personal information table 300 is not registered, personal information server 102 transmits a response "non-registered user detection notification".

When personal information server I/F 120 receives the "non-registered user detection notification" response, personal information controller 118 of multifunction apparatus 100 gives the "non-registered user detection notification" response to panel controller 115 and performs a process to prohibit the use of the non-registered user (ST 406). Upon receiving the "non-registered user detection notification" response, panel controller 115 displays a message indicating that the user is a non-registered user on large-size touch panel 116.

Accordingly, multifunction apparatus 100 can prohibit the use of the apparatus by the non-registered user and displays an indication for the non-registered user that the user is a non-registered user. Therefore, multifunction apparatus 100 not only prevents the illegal use of the non-registered user but also encourages the non-registered user to register their information.

When personal information server I/F 120 receives the "registered user detection notification" response, personal information controller 118 uses personal information server I/F 120 to retrieve, from personal information server 102, the information of personal information table 300 corresponding to the transmitted user ID 201. Then, the information is stored in work area 121 (ST 407).

Next, printer controller 111 of multifunction apparatus 100 refers to warm-up information (whether the warm-up operation is needed) 302 in personal information table 300, which is stored in work area 121, in order to determine whether the advance warm-up operation is needed (ST 408).

Figure 6:
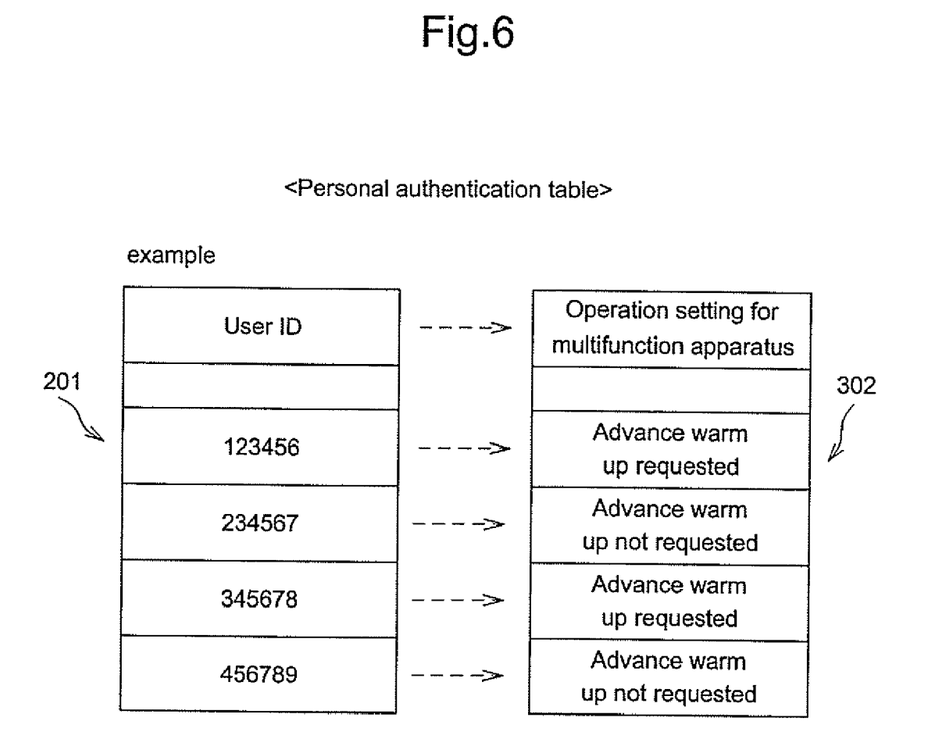
FIG. 6 illustrates personal information of users according to the embodiment of the present invention.

Using FIG. 6 as an example, printer controller 111 determines that the advance warm-up operation is needed for users "123456" and "345678" (in user ID 201), since their warm-up information (whether the warm-up operation is needed) 302 includes "Yes". For users "234567" and "456789", printer controller 111 determines that the normal warm-up is performed, since their warm-up information (whether the warm-up operation is needed) 302 includes "No".

When it is determined that the warm-up operation is not needed at ST 408, printer controller 111 notifies job controller 122 that the advance warm-up operation is not needed. Then, job controller 122 instructs panel controller 115 to display personal information 301 of the registered user. Or, job controller 122 can instruct panel controller 115 to display the name of the registered user without the notification that the advance warm-up operation is not needed. Then, panel controller 115 retrieves, from work area 121, personal information 301 in personal information table 300, so that personal information 301 (e.g., name of the registered user) is displayed on large-size touch panel 116 (ST 409).

When panel controller 115 detects the user's initiation of an operation (e.g., setting a document, pressing a energy-save button) from large-size touch panel 116 (ST 410), the detection result is transmitted to job controller 122, which is then forwarded to printer controller 111 by job controller 122. Then, printer controller initiates the warm-up (normal warm-up) operation of heater unit 112 (ST 411).

When the warm-up period ends and heater unit 112 reaches a predetermined temperature (completion of the warm-up period of heater unit 112), printer controller 111 notifies job controller 122 of the warm-up completion. Then, job controller 122 transmits an instruction to display the menu screen for selecting and initiating a job (e.g., copying, faxing, printing, scanning, etc.) so that panel controller 115 displays the menu screen on large-size touch panel 116 (ST 412).

When panel controller 115 detects the user's initiation of a job from large-size touch panel 116, job controller 122 is notified of the initiated job (ST 413) and job controller 122 starts the job by giving instructions to units that execute the selected job (ST 414).

Accordingly, when the user has a setting for the normal warm-up, the warm-up operation is started after the user's instruction to start the operation.

In contrast, when it is determined that the warm-up operation is needed at ST 408, printer controller 111 notifies job controller 122 that the advance warm-up operation is needed. Then, job controller 122 instructs panel controller 115 to display personal information 301 of the registered user. Then, panel controller 115 retrieves, from work area 121, personal information 301 in personal information table 300, so that personal information 301 (e.g., name of the registered user) is displayed on large-size touch panel 116 (ST 417).

In this case, the advance warm-up operation is to be performed. Therefore, printer controller 111 starts the warm-up operation of heater unit 112 (ST 418).

Accordingly, when the advance warm-up operation is set up, heater unit 112 is warmed up in advance without waiting for the operation initiation from the user. Therefore, it is possible to warm up heater unit 112 in advance, thereby shortening the time spent by the user to wait for the completion of the warm-up operation after the user arrives at multifunction apparatus 100.

When the warm-up period expires and heater unit 112 reaches a predetermined temperature (completing the warm-up operation), printer controller 111 notifies job controller 122 of the completion of the warm-up. Next, job controller 122 transmits an instruction to panel controller 115 so that panel controller 115 displays a menu screen, on large-size touch panel 116, for selection and initiation of a job (e.g., copying, faxing, printing, scanning, etc.) (ST 419).

When panel controller 115 detects the user's initiation of a job from large-size touch panel 116, job controller 122 is notified of the initiated job (ST 420) and job controller 122 starts the job (ST 422) by giving instructions to units that execute the selected job (ST 421).

Accordingly, when the user has the advance warm-up setting, the warm-up operation is started when the user approaches multifunction apparatus 100 and enters the detection area, without waiting for the operational instruction of the user.

When a job execution is completed at ST 415 and ST 423, job controller 122 notifies RFID controller 117 of the job completion (ST 416 and ST 424).

Then, RFID controller 117 determines whether the user ID of the user is detected as the identification information (ST 425). This is for a situation where the user who has requested the job remains in the detection area in order to input another job on multifunction apparatus 100. In this situation, it is preferable for multifunction apparatus 100 to remain in the normal mode.

Therefore, when the job is completed, multifunction apparatus general controller 110 determines whether the user ID of the user who executed the job is detected from the identification information detected by RFID controller 117 (no detection when no user is in the detection area). When the user ID of the user who executed the job is detected, multifunction apparatus 100 remains in the same mode (i.e., normal mode) (ST 426). When the user ID of the user who executed the job is not detected, multifunction apparatus 100 transitions to the energy-save mode (ST 427).

Accordingly, RFID controller 117 determines whether the user (user ID, in reality) who requested the job is detected, upon completion of the job. When the user is not detected, multifunction apparatus 100 immediately transitions to the energy-save mode, thereby decreasing the energy consumption compared to when the transition to the energy-save mode is done after remaining in the normal mode for a predetermined time period.

Figure 7:
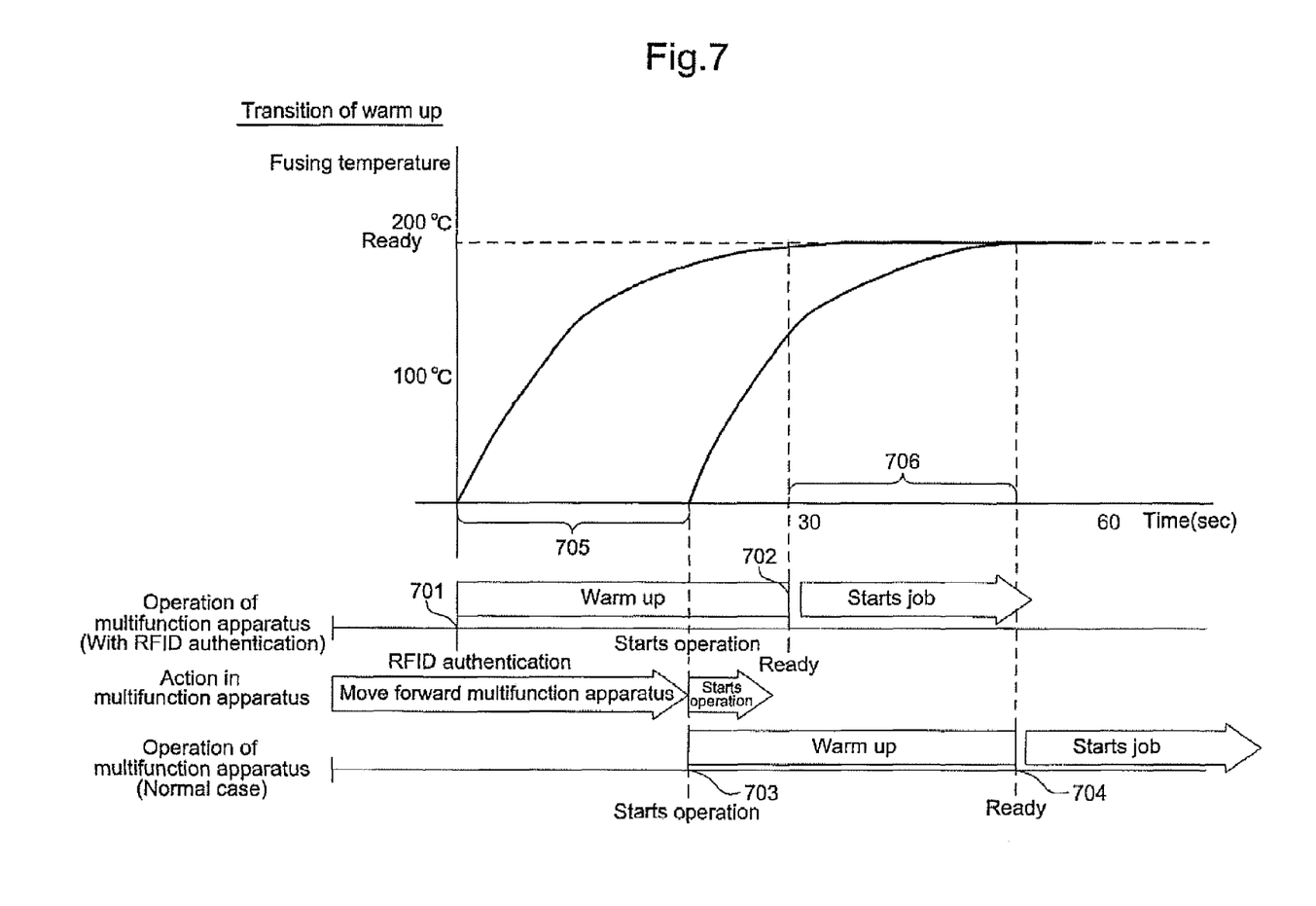
FIG. 7 illustrates a transition of warm-up operation according to the embodiment of the present invention.

FIG. 7 illustrates how the time spent by the user is shortened by the advance warm-up operation, from when the user arrives at multifunction apparatus 100 until when the warm-up operation is completed.

As shown in FIG. 7, when the advance warm-up operation is set, the warm-up operation starts at time 701, immediately after data in memory card 200 of the user is detected. The warm-up operation ends at time 702 when heater unit 112 reaches a predetermined temperature (after a warm-up period).

In contrast, when the normal warm-up is set, the warm-up operation starts at time 703, when an operation on multifunction apparatus 100 is started. The warm-up operation ends at time 704 when heater unit 112 reaches a predetermined temperature (after a warm-up period).

In sum, by having the advance warm-up setting, the warm-up is started earlier (amount measured by time 705) compared to the normal warm-up operation. Therefore, the warm-up completion time is advanced by the amount of time 706. As a result, the job starting time on multifunction apparatus 100 is also advanced by time 706.

Accordingly, when the user has the advance warm-up setting on multifunction apparatus 100, the user can initiate the warm-up of the fusing apparatus only by approaching multifunction apparatus 100. Accordingly, it is possible to advance the timing of the warm-up start of the fusing apparatus, thereby shorting the time period spent by user from when user arrives at multifunction apparatus 100 until the warm-up operation is completed. In addition, the warm-up operation is started immediately after the user authentication is performed, only when the advance warm-up is set up in personal information table 300. In other words, the user has a choice of having the advance warm-up set up (which initiates the warm-up operation immediately after the user authentication) or the normal warm-up operation (which initiates the warm-up operation after the user starts the operation).

Figure 8:
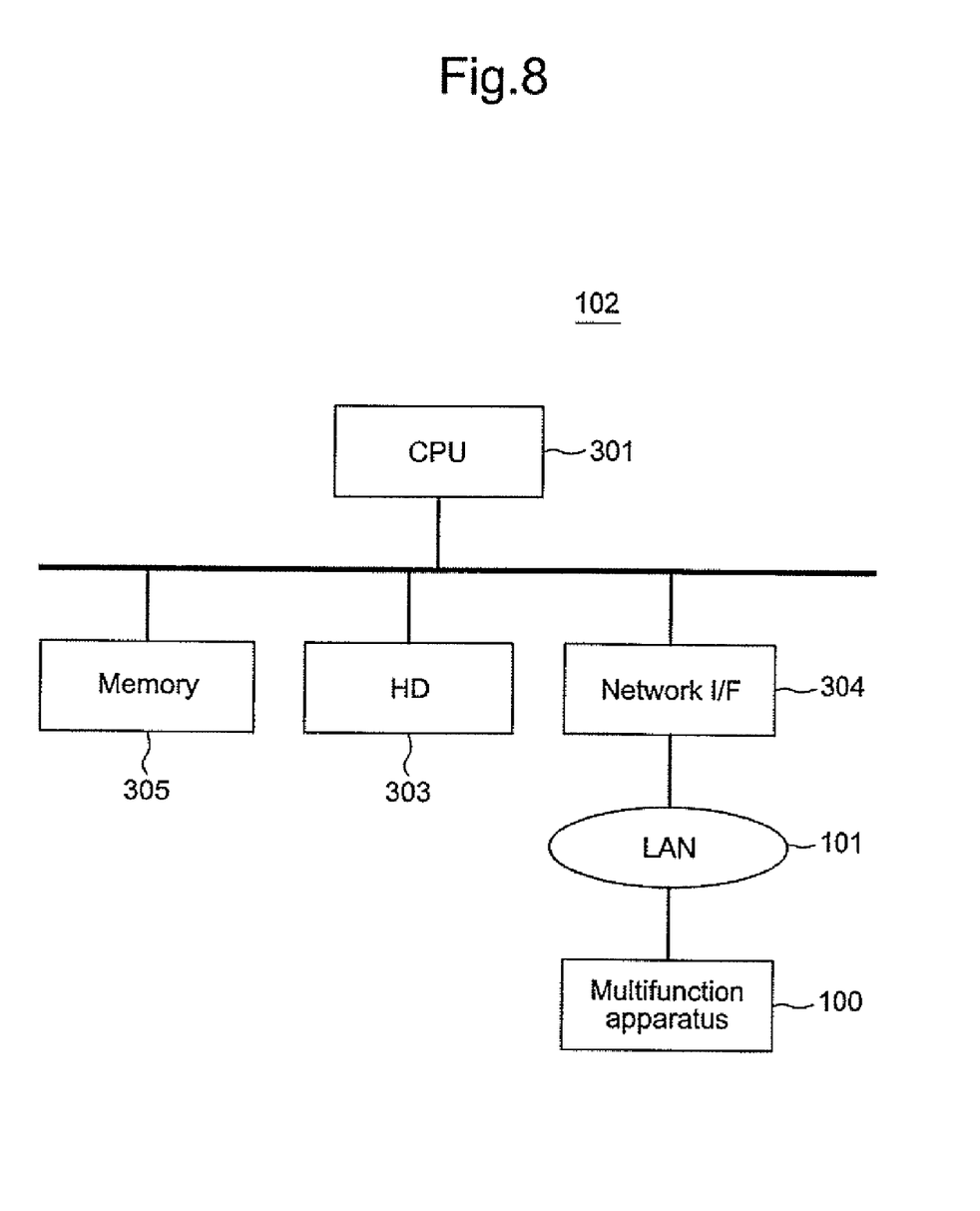
FIG. 8 is a block diagram illustrating a server according to the embodiment of the present invention.

FIG. 8 is a functional block diagram of server 102 connected to multifunction apparatus 100, via LAN 101, according to the embodiment.

Server 102 shown in FIG. 8 includes CPU 301 that controls the entire apparatus. Memory 305 stores control programs to be used by CPU 301 for controlling the entire apparatus, and has a function to perform as work memory of CPU 301. Hard disk (HD) 303 stores information to be distributed to multifunction apparatus 100 according to the present embodiment. For example, when server 102 functions as a server for personal information, the personal information table is stored for each registered user. When server 102 functions as a web server, server 102 stores menus for multifunction apparatus 100 and related jobs. Network interface (I/F) 304 interfaces with LAN 101.

Figure 9:
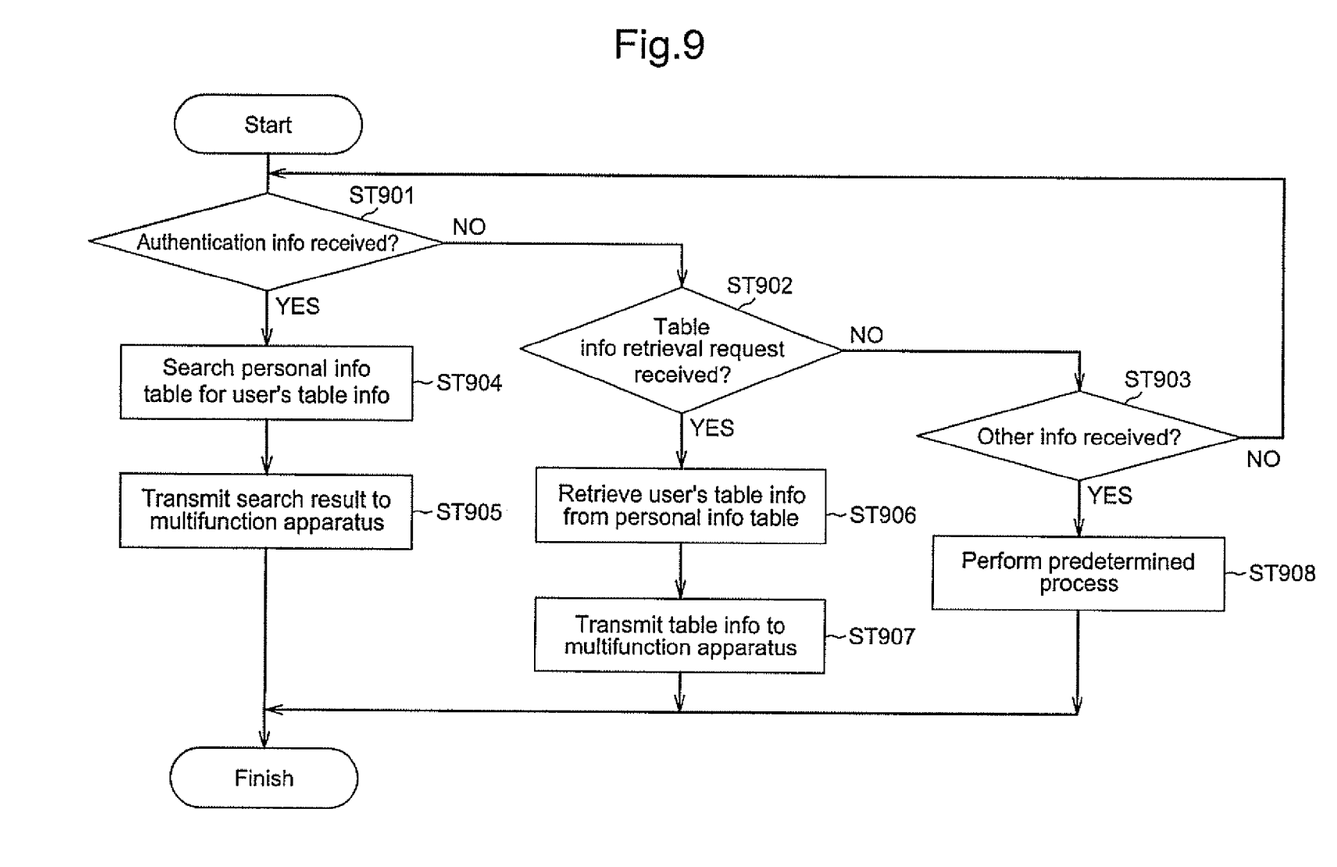
FIG. 9 is a flowchart illustrating an operation of the server according to the embodiment of the present invention.

FIG. 9 illustrates a process of server 102 having the above-described configuration. In FIG. 9, in particular, server 102 functions as a personal authentication server.

Server 102 as a personal authentication server monitors, in an idle state, a reception of various information from multifunction apparatus 100 according to the present embodiment. In particular, server 102 monitors receptions of identification information (user ID) (ST 901), request to retrieve table information (ST 902), and other information (ST 903).

When personal identification information is received at ST 901, during the monitoring of receptions of various information, table information of the registered user is searched from personal information table 300 stored in HD 303 (ST 904). Accordingly, it is determined whether the received identification information is registered in personal information table 300. Then, the result of the search (i.e., whether the identification information is registered) is transmitted to the accessing multifunction apparatus 100 (ST 905). When the transmission process of the search result is completed, server 102 terminates the process.

When a request to retrieve information from personal information table 300 is received at ST 902, table information of the registered user is retrieved from personal information tables 300 stored in HD 303 (ST 906). Accordingly, personal information table 300 of the registered user (associated with the previously received identification information) is retrieved. Then, information of personal information table 300 (including personal information 301 and warm-up start information 302) is transmitted to the accessing multifunction apparatus 100 (ST 907). When the transmission process of the table information is completed, server 102 terminates the process.

When other information is received at ST 903, server 102 performs a process required for the information (ST 908). When the required process is completed, server 102 terminates the process.

Server 102 is configured as described above. Server 102 performs user authentication, transmission of personal information 301 and warm-up information (warm-up start information) 302, and other operations using personal information table 300.

In the present embodiment, personal information server 120 stores personal information table 300 and separately manages the search on whether the user is registered (for user authentication) and the storage of personal information 301 and warm-up start information 302. However, personal information table 300 can be stored in multifunction apparatus 100 in advance, in a memory apparatus such as a hard disk within multifunction apparatus 100. Multifunction apparatus 100 can then perform the user authentication and determine the need for advance warm-up start. With this system, there is no need to obtain personal information 301 and advance warm-up start information 302 from server 102, and multifunction apparatus 100 can perform the warm-up operations by itself.

It is noted that the foregoing examples have been provided merely for the purpose of explanation and are in no way to be construed as limiting of the present invention. While the present invention has been described with reference to exemplary embodiments, it is understood that the words which have been used herein are words of description and illustration, rather than words of limitation. Changes may be made, within the purview of the appended claims, as presently stated and as amended, without departing from the scope and spirit of the present invention in its aspects. Although the present invention has been described herein with reference to particular structures, materials and embodiments, the present invention is not intended to be limited to the particulars disclosed herein; rather, the present invention extends to all functionally equivalent structures, methods and uses, such as are within the scope of the appended claims.

The present invention is not limited to the above described embodiments, and various variations and modifications may be possible without departing from the scope of the present invention.

This application is based on the Japanese Patent Applications Nos. 2004-052000 filed on Feb. 26, 2004 and 2004-163634 filed on Jun. 1, 2004 entire content of which is expressly incorporated by reference herein.

What is claimed is:

1. A multifunction apparatus having a plurality of functions including a copier function, the apparatus comprising:
    a detector that detects a memory medium carried by a user and retrieves identification information stored in the memory medium;
    a memory that stores user information; and
    a controller that determines whether the retrieved identification information conforms with the user information stored in said memory when an operation of the multifunction apparatus is completed and said detector detects the memory medium, said controller switching from a normal mode to an energy-saving mode when the retrieved identification information conforms with the user information, the energy-saving mode being a state where a consumption of electrical power by the multifunction apparatus is less than in the normal mode.

2. The multifunction apparatus of claim 1, wherein said detector detects the memory medium and retrieves the identification information stored in the memory medium via a non-contact reading.

3. The multifunction apparatus of claim 1 wherein said detector detects the memory medium and retrieves the identification information stored in the memory medium using electromagnetic wave signals.

4. The multifunction apparatus of claim 3, wherein said detector comprises a RFID controller.

5. A multifunction apparatus having a plurality of functions including a copier function, comprising:
    a detector that detects a memory medium carried by a user and retrieves identification information stored in the memory medium;
    an interface that connects with a storage device that stores user information and retrieves the user information from the storage device;
    a controller that determines whether the identification information retrieved from the memory medium conforms with the user information retrieved from the storage device when an operation of the multifunction apparatus is completed and said detector detects the memory medium, wherein said controller switches the multifunction apparatus from a normal mode to an energy-saving mode when the retrieved identification information conforms with the retrieved user information, the energy-saving mode being a reduced electrical power consuming state as compared to the normal mode.

6. The multifunction apparatus of claim 5, wherein said detector detects the memory medium and retrieves the identification information stored in the memory medium via a non-contact reading.

7. The multifunction apparatus of claim 5, wherein said detector detects the memory medium and retrievals the identification information stored in the memory medium using electromagnetic wave signals.

8. The multifunction apparatus of claim 7, wherein said detector comprises a RFID controller.

* * * * *